(12) United States Patent
Endoh et al.

(10) Patent No.: US 6,453,180 B1
(45) Date of Patent: *Sep. 17, 2002

(54) VEHICLE-INSTALLED TELEPHONE APPARATUS

(75) Inventors: Yoshiaki Endoh; Masao Yoshida; Katsuaki Kawamura; Kazuhiro Kamiya; Mika Kawabata, all of Saitama-ken (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,403

(22) Filed: Dec. 2, 1998

(30) Foreign Application Priority Data

Dec. 5, 1997 (JP) .............................. 9-335967

(51) Int. Cl.$^7$ ................................. H04B 1/38
(52) U.S. Cl. ...................... 455/567; 455/550; 455/412; 455/557; 455/238.1
(58) Field of Search ................................ 455/567, 550, 455/572, 557, 458, 238.1, 413, 412, 67.1

(56) References Cited

U.S. PATENT DOCUMENTS

| | | | | |
|---|---|---|---|---|
| 5,058,150 A | * | 10/1991 | Kang | 379/58 |
| 5,548,806 A | * | 8/1996 | Yamaguchi et al. | 455/33.1 |
| 5,627,881 A | * | 5/1997 | Fletcher | 379/60 |
| 5,701,341 A | * | 12/1997 | Kuo | 379/433.1 |
| 5,845,219 A | * | 12/1998 | Henriksson | 455/567 |
| 5,898,926 A | * | 4/1999 | Konishi | 455/441 |
| 6,014,566 A | * | 1/2000 | Owada | 455/444 |
| 6,052,603 A | * | 4/2000 | Kinzalow | 455/557 |
| 6,108,532 A | * | 8/2000 | Matsuda et al. | 455/413 |
| 6,311,078 B1 | * | 10/2001 | Hardouin | 455/567 |

FOREIGN PATENT DOCUMENTS

| | | | | |
|---|---|---|---|---|
| JP | 1-205637 | * | 8/1989 | 455/31.2 |
| JP | 3-110933 | * | 5/1991 | 455/31.2 |

* cited by examiner

Primary Examiner—Thanh Cong Le
Assistant Examiner—Lana Le
(74) Attorney, Agent, or Firm—Arent Fox Kintner Plotkin & Kahn

(57) ABSTRACT

A vehicle-installed telephone apparatus comprises a portable phone with announcing means controlled by a microcomputer, running detecting means which detects that a vehicle is running, incoming call detecting means which detects that an incoming call is received and control means which sends control signals to the portable phone. The control means sends control signals which invalidate the operation of the announcing means to the microcomputer within the portable phone, when the running detecting means detects that the vehicle is running and the incoming call detecting means detects that the incoming call is received at the same time, whereby a driver can concentrate on driving without being diverted his attention, even if an incoming call is received while driving.

30 Claims, 3 Drawing Sheets

VEHICLE-INSTALLED TELEPHONE APPARATUS

BACKGROUND OF THE INVENTION

The present invention relates to a vehicle-installed telephone apparatus that is installed on vehicles and the like.

Recently, with the spread of car telephones and portable phones, the scene, that drivers respond to the incoming call of a portable phone and the like, is often observed on the street. Since the danger of the case where drivers call while driving vehicles and the like is well known, it has been beginning to emerge the necessity for taking measures that the drivers do not have to respond to the incoming call of the portable phone. Therefore, in the prior art, proposed was a vehicle-installed telephone apparatus having a function that when an incoming call of the telephone is confirmed while a vehicle is running, it is automatically switched to the speaking state and announces that the driver can not respond because of while driving, in order not to have to respond immediately to the portable phone, even if its ringing sounds are rung while the vehicle is running(Japanese Patent Laid-open Publication No.7-115680).

In addition, there is another prior art in which the driver is informed that an incoming call is received through the direct conduction of vibration to the driver by means of a vibrator function of the vehicle-installed telephone apparatus without making ringing sounds when they become an incoming state.

However, the above-mentioned vehicle-installed telephone apparatus has a problem that the ringing sounds of the vehicle-installed telephone apparatus are suddenly rung or vibrations are suddenly started when an incoming call is received while driving. In other wards, when a driver concentrates his consciousness on driving a vehicle, he/she would be instantaneously surprised by suddenly making ringing sounds or starting vibration, and while he/she would be preoccupied with the vehicle-installed telephone apparatus, he/she could not concentrate on driving vehicles and the like. Therefore, he/she would become scatterbrained and enter in a very dangerous condition.

SUMMARY OF THE INVENTION

Accordingly, an object of the present invention is to provide a vehicle-installed telephone apparatus which can particularly make a driver be able to concentrate on driving vehicles and the like without preoccupying with the vehicle-installed telephone in view of the problems in the prior arts of the vehicle-installed telephone apparatus.

According to the present invention, there is provided a telephone apparatus, which is installable on vehicles, and comprises running detecting means for detecting that the vehicle is running, incoming call detecting means for detecting that an incoming call is received, announcing means for announcing that the incoming call has been received, and control means for controlling the announcing means. When the running detecting means detects that the vehicle is running and the incoming call detecting means detects that the incoming call is received at the same time, the control means controls in such a manner as to invalidate the operation of the announcing means, which is controlled by a microcomputer built in a portable phone. Accordingly, the driver is not bothered with the ringing sound of the portable phone while driving and can concentrate on driving, thereby the safety of driving is improved.

It is a further object of the present invention to provide the vehicle-installed telephone apparatus, further comprising message transmitting means controlled by the control means. The control means controls in such a manner as to send messages stored in the message transmitting means when the running detecting means detects that the car is running and the incoming call detecting means detects that the incoming call is received at the same time. Because of this, it is possible to announce that the driver can not answer the incoming call because of while driving, and the sending-side can avoid being worried because the sending-side can know the reason why the driver can not answer the incoming call.

It is another object of the present invention to provide the vehicle-installed telephone apparatus further comprising voice synthesizing means controlled by the control means and a memory where data of incoming call records is stored. The control means controls in such a manner that messages on the basis of the data of incoming call records stored in the memory are converted into voice by the voice synthesizing means, and that the voice is output, when the running detecting means detects that the vehicle is not running. Therefore, the driver can know immediately that incoming calls are received, because the data of incoming call records is read out automatically when the vehicle is stationary, and can deal with them by calling back from the vehicle-installed telephone apparatus.

BRIEF DESCRIPTION OF THE DRAWINGS

The present invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
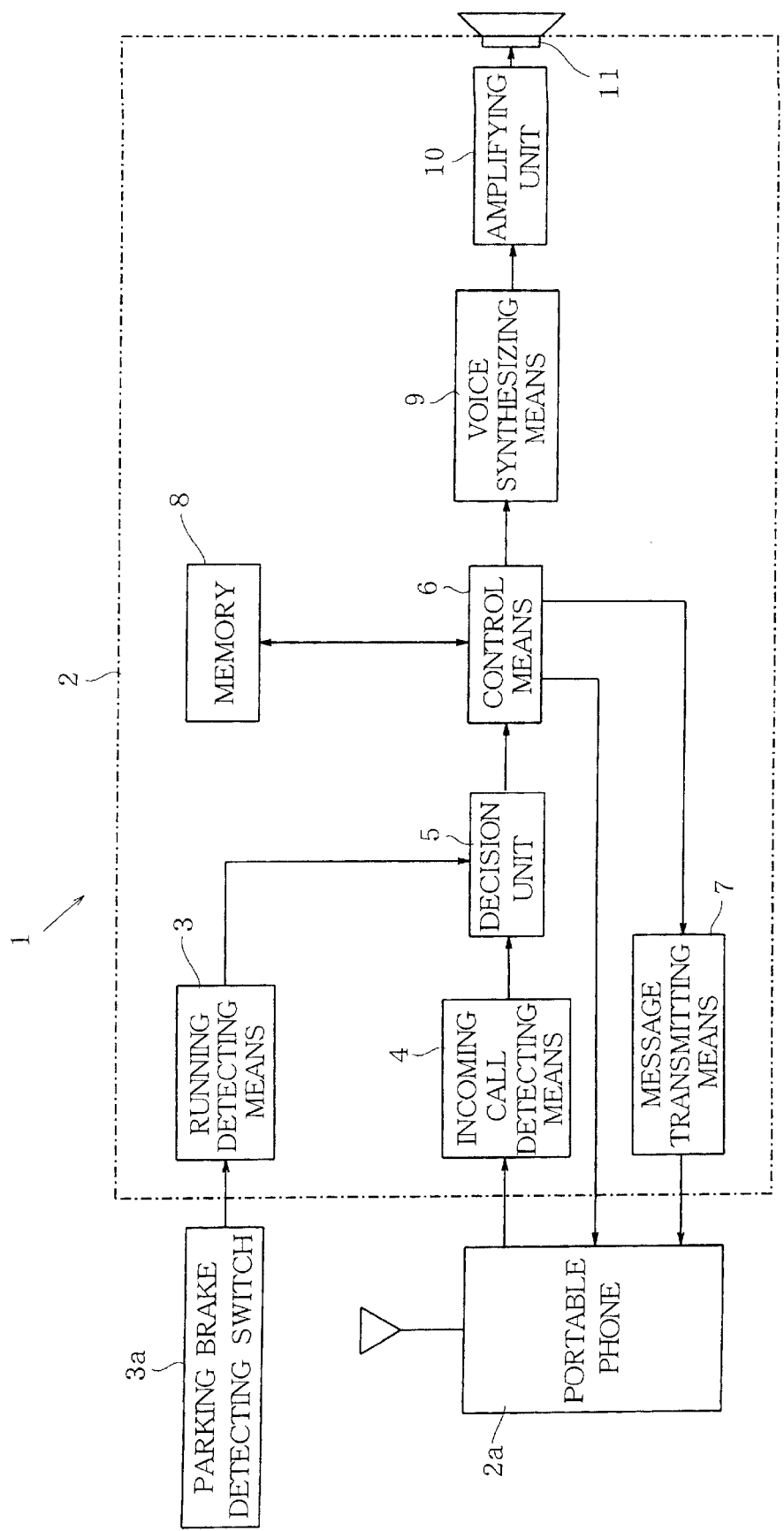
FIG. 1 is a schematic diagram for explaining a system of a vehicle-installed telephone apparatus according to the present invention.

Referring to FIG. 1, a reference numeral 1 denotes a vehicle-installed telephone apparatus. The vehicle-installed telephone apparatus 1 comprises a main body 2 of the apparatus, a portable phone 2a with announcing means controlled by a microcomputer, and a parking brake detecting switch 3a. Within the main body 2, there are provided running detecting means 3 that detects whether the vehicle is running or stationary according to a signal from the parking brake detecting switch 3a, incoming call detecting means 4 that detects whether the portable phone 2a receives an incoming call or not, a decision unit 5 where each of signals from the running detecting means 3 and the incoming call detecting means 4 are input, and control means 6. The decision unit 5 makes a decision whether any incoming calls are received by the portable phone 2a or not, and under what kind of vehicle conditions they are received, and then output signals of the decision are output to the control means 6. The control means 6 controls a plurality of means, which are described later, provided inside the main body 2 of the apparatus according to the output signals from the decision unit 5. Output signals from the control means 6 can be fed to message transmitting means 7 which previously holds messages such as that the driver can not answer to a sending-person because of while driving to transmit the messages, a memory 8 where data of incoming call records is stored, and voice synthesizing means 9 which convert messages according to the data of incoming call records into voice. Particularly, the control means 6 and the memory 8 are allowed to input and to output signals between the both means, and the memory 8 is provided with not only the function of storing the data of incoming call records but also the functions of an automatic sound recording, forming read-out data lists of the incoming call records and memorizing them. The output signals of the message transmitting means 7 are input to the microcomputer of the portable phone 2a. Additionally, the control signals from the control means 6 are also directly input to the microcomputer of the portable phone 2a. Depending on the control signal from the control means 6 received by the microcomputer of the portable phone 2a, the microcomputer of the portable phone 2a controls the announcing means of the portable phone 2a so as to be brought into operation or not. Moreover, the voice signals from the voice synthesizing means 9 is input to an amplifying unit 10, and then it is output from a speaker 11.

Figure 2A:
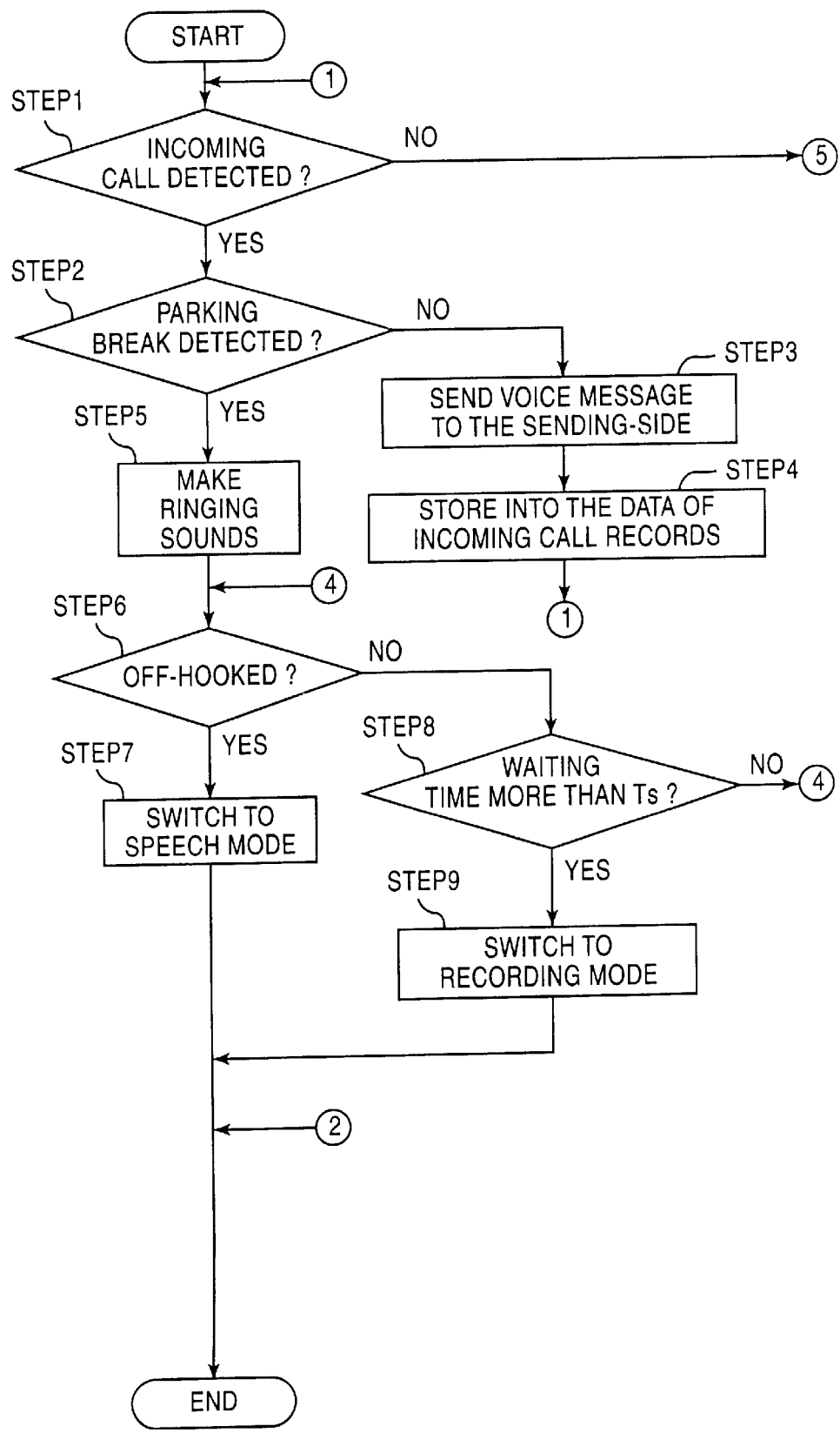
FIGS. 2a and 2b are flow chart diagrams illustrating a basic operation of the vehicle-installed telephone apparatus shown in FIG. 1.
Figure 2B:
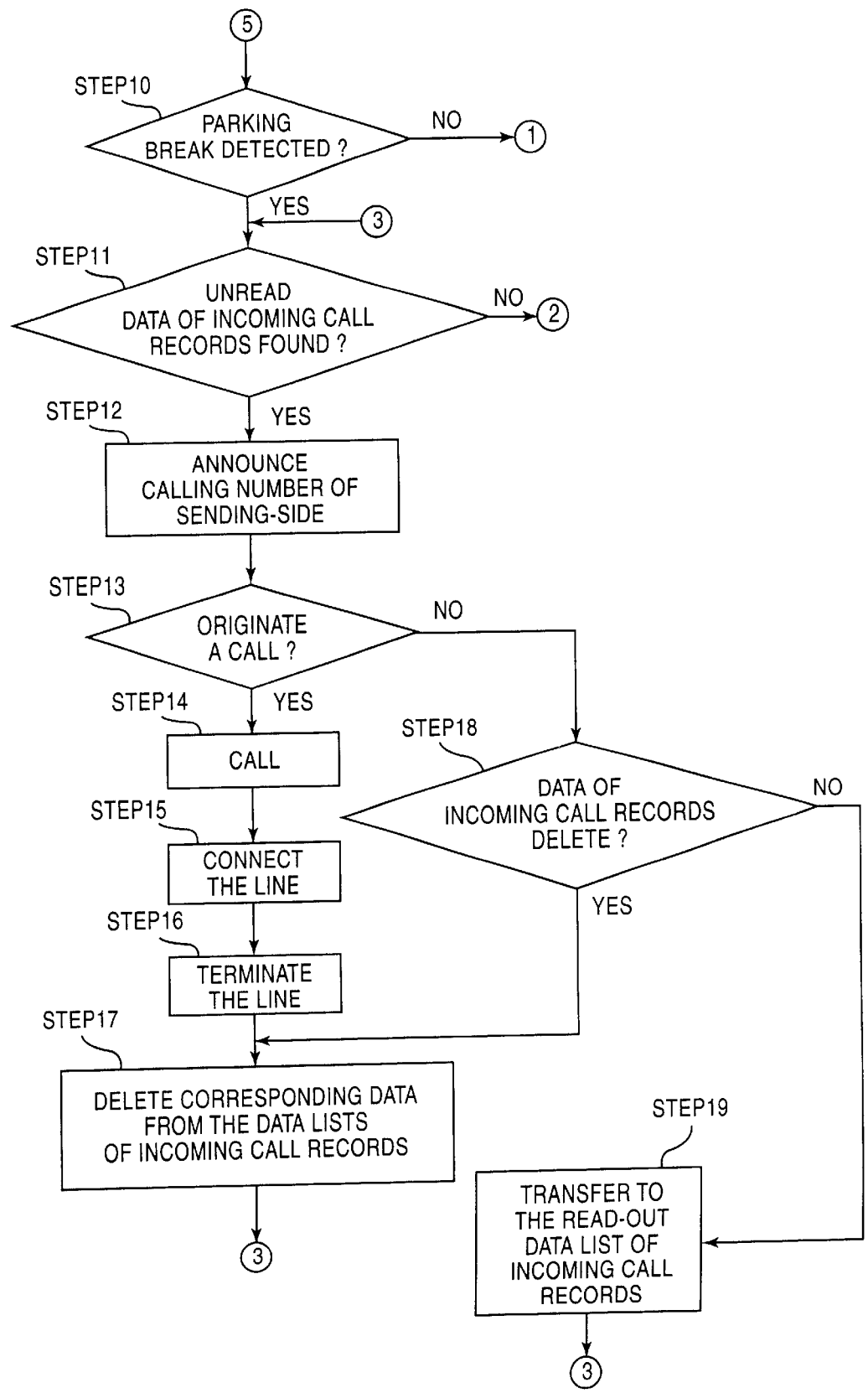

Next, the basic operation of the vehicle-installed telephone apparatus 1 according to the present invention will be explained by means of the flow chart in FIGS. 2a and 2b.

At step 1, whether an incoming call to the portable phone 2a is present or absent is judged. If the incoming call is present, go to step 2 and if the incoming call is absent, go to step 10. In the case of going to step 10, it will be described later. Next, at step 2, whether a parking brake is brought into operation or not is judged. If the operation is not detected, go to step 3 and if it is detected, go to step 5. In the case of going to step 5, it will be described later.

In the case of going to step 3, the line is connected with a sending-side without making ringing sounds of the portable phone 2a and a previously set message, for example, such as "I will call back later, because I am driving now." is replied to the sending-side without attracting the driver's attention. Next, go to step 4 and a call subscriber number, which is hereinafter referred to as a calling number, and the like are stored as incoming call records into the memory 8 which stores the data of the incoming call records. Upon hanging up at the sending-side, the call is terminated, and then the vehicle-installed telephone apparatus 1 is on standby until receiving next incoming call.

In the case of going to step 5, in order to announce that the portable phone 2a has received an incoming call, ringing sounds are rung. Next go to step 6, and if it is made a judgement that the portable phone 2a is off-hooked, go to step 7, then upon switching the portable phone 2a to the speaking mode, the portable phone 2a is turned in normal speaking condition. If it is made a judgement that the portable phone 2a is not off-hooked, go to step 8, then the ringing sounds are rung until a predetermined time Ts has elapsed. After the predetermined time has elapsed, go to step 9, and while the portable phone 2a is switched to the automatic sound recording mode, messages from the sending-side are recorded in the memory 8. Upon hanging up at the sending-side, the call is terminated.

In the case of going to step 10, if it is made a judgement according to the output signals from the running detecting means 3 that the vehicle is stationary, go to step 11, and if the vehicle is running, then the vehicle-installed telephone apparatus 1 is on standby until receiving a next incoming call. At step 11, it is confirmed whether unread data among all data of incoming call records stored in the memory 8 is present or absent. If it is present, go to step 12, the unread data of incoming call records stored in the memory 8 is converted into voice by the voice synthesizing means 9. Then the converted voice is amplified by the amplifying unit 10, and the first calling number of the sending-side is automatically read out with the voice through the speaker 11. At step 13, if a driver selects one of these data of incoming calls and wants to originate a call to it, it can be automatically done with pushing one key. The sending-side is called up at step 14, the line is connected, the driver has a conversation at step 15, and then the call is terminated, when the driver-side or the sending-side hangs up at step 16. Then the corresponding data is deleted from the data list of incoming call records stored in the memory 8 at step 17. Next, return to step 11 in order to retrieve any unread data of incoming call records.

If the driver does not select to originate a call to the data of incoming call records at step 13, then go to step 18, where it is selected whether the corresponding data should be deleted from the data of incoming call records in the memory 8. If Yes, go to step 17. If No, go to step 19, then the corresponding data is transferred to the read-out data lists of incoming call records. When the corresponding data is deleted at step 17 or is finished transferring to the read-out data lists of incoming call records, return to step11 in order to retrieve any other unread data of incoming call records. And the sequential processing in compliance with the flow chart from step 11 to step 19 is performed until all the unread data of incoming call records are disappeared, and if the unread data of incoming call records can not be retrieved, the processing is terminated.

Moreover, it is possible to re-originate a call from the read-out data of incoming call records. In this case, a name and a telephone number are indicated similar to the ordinary originating call from a telephone directory function of the portable phone.

Next, explained is the process in a case where the portable phone 2a receives an incoming call while a vehicle is running.

First of all, the incoming call detecting means 4 connected with the portable phone 2a outputs the signals received by the portable phone 2a to the decision unit 5. When the decision unit 5 makes a judgement according to the output signals from the running detecting means 3 that the vehicle is running, the signals that the portable phone 2a received an incoming call while the vehicle was running, are output to the control means 6. Then, the control means 6 outputs control signals that announcement is invalidated to the microcomputer within the portable phone 2a. Since the microcomputer which received the control signals controls in such a manner as to invalidate the operation of the announcing means such as ringing sounds within the portable phone 2a, the ringing sounds of the portable phone 2a are not rung.

On the other hand, the control means 6 connects the line with a sending-side without making ringing sounds of the portable phone 2a and a previously set message, for example, such as "I will call back later, because I am driving now." is replied to the sending-side without attracting the driver's attention.

Next, the control means 6 stores a calling number and the like as incoming call records into the memory 8 which stores the data of the incoming call records. Upon hanging up at the sending side, the call is terminated, and then the portable phone 2a is on standby until receiving the next incoming call.

Further, explained is the process in a case where the portable phone 2a receives an incoming call while a vehicle is stationary.

First of all, when the portable phone 2a receives an incoming call, whether the vehicle is stationary or not is judged at the decision unit 5 according to the signals detected by the parking brake detecting switch 3a. If it is made a judgement that the vehicle is stationary, the control means 6 outputs the control signals that the announcement such as ringing sounds is validated, to the microcomputer within the portable phone 2a. Then, since the microcomputer receiving the control signals controls in such a manner as to validate the operation of the announcing means within the portable phone 2a, the ringing sounds of the portable phone 2a are rung. Next, if it is made a judgement that the portable phone 2a is off-hooked, upon switching the portable phone 2a to the speaking mode, it is turned in normal speaking condition. If it is made a judgement that the portable phone 2a is not off-hooked, the ringing sounds are rung until a predetermined time has elapsed. After the predetermined time has elapsed, while the portable phone 2a is switched to the automatic sound recording mode, the messages from the sending-side are recorded in the memory 8, then the portable phone 2a is on standby until receiving the next incoming call.

Last, explained is the process in a case where the portable phone 2a receives an incoming call while a vehicle is running, and then the vehicle is brought into a standstill.

When it is made a judgement at the decision unit 5 according to the output signals from the running detecting means 3 that the vehicle is stationary, the control means 6 confirms whether any unread data among the data of incoming call records stored in the memory 8 is present or absent. If it is present, the unread data of incoming call records stored in the memory 8 is converted to voice by the voice synthesizing means 9, the voice is amplified by the amplifying unit 10, and then the calling number of the sending-side is automatically read out one by one with voice through the speaker 11.

If the driver selects to call to one of the unread data of incoming call records, it can be automatically done to call with pushing one key. The sending-side is called up, when the line is connected, the driver has a conversation, and then the call is terminated, while the driver-side or the sending-side hangs up. Then the corresponding data is deleted from the data list of incoming call records within the memory 8.

Then, if the driver does not select to call to the corresponding data, the driver can select to delete the corresponding data from the data of incoming call records within the memory 8, or to transfer them to the read-out data lists of incoming call records. Then, when the driver re-originates a call from the read-out data of incoming call records, a name and a telephone number are indicated similar to the case of ordinary originating a call from a telephone directory function of the portable phone.

The above-mentioned detection of whether a vehicle is running or stationary may be detected by a vehicle speed sensor, instead of the shown example of using the parking brake detecting switch 3a.

As described above, according to the present invention, even if the portable phone receives an incoming call while a vehicle is running, the driver is not bothered with the ringing sounds of the portable phone and can concentrate on driving, so that the safety can be improved since the control means provided in the vehicle-installed telephone apparatus controls in such a manner as to invalidate the operation of the announcing means controlled by the microcomputer incorporated in the portable phone. At that time, since the sending-side can know the reason why the receiving side can not answer the incoming call by automatically announcing that the driver can not answer the incoming call because of while driving to the sending-side with the control means, the sending-side can avoid being worried. Moreover, since the data of incoming call records is read out by the control means when the vehicle is stationary, the driver can know at once that any incoming calls are received, and can deal with them by calling back immediately from the vehicle-installed telephone apparatus.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A vehicle-installed telephone apparatus comprising:
   running detecting means for detecting that a vehicle is running;
   incoming call detecting means for detecting an incoming call;
   announcing means for announcing to a driver that the incoming call has been received; and
   control means for controlling said announcing means,
   wherein said control means invalidates said announcing means from announcing to a driver that the incoming call has been received when said running detecting means detects that the vehicle is running and said incoming call detecting means detects that the incoming call is received at the same time.

2. The vehicle-installed telephone apparatus according to claim 1, wherein said running detecting means is connected to a parking brake detecting switch.

3. The vehicle-installed telephone apparatus according to claim 2, further comprising:
   message generating means controlled by said control means,
   wherein said control means sends messages stored in said message generating means to a sending-side when said running detecting means detects that the vehicle is running and said incoming call detecting means detects that the incoming call is received at the same time.

4. The vehicle-installed telephone apparatus according to claim 2, further comprising:
   a memory for storing the data of incoming call records,
   wherein said control means converts messages according to the data of incoming call records stored in said memory into voice to output it when said running detecting means detects that the vehicle is not running.

5. The vehicle-installed telephone apparatus according to claim 1, wherein said running detecting means is connected to a vehicle speed sensor.

6. The vehicle-installed telephone apparatus according to claim 5, further comprising:
   message generating means controlled by said control means,
   wherein said control means sends messages stored in said message generating means to a sending-side when said running detecting means detects that the vehicle is running and said incoming call detecting means detects that the incoming call is received at the same time.

7. The vehicle-installed telephone apparatus according to claim 5, further comprising:
   a memory for storing the data of incoming call records,
   wherein said control means converts messages according to the data of incoming call records stored in said memory into voice to output it when said running detecting means detects that the vehicle is not running.

8. The vehicle-installed telephone apparatus according to claim 1, wherein said announcing means is included in a portable phone or a car telephone.

9. The vehicle-installed telephone apparatus according to claim 8, further comprising:
message generating means controlled by said control means,
wherein said control means sends messages stored in said message generating means to a sending-side when said running detecting means detects that the vehicle is running and said incoming call detecting means detects that the incoming call is received at the same time.

10. The vehicle-installed telephone apparatus according to claim 8, further comprising:
a memory for storing the data of incoming call records,
wherein said control means converts messages according to the data of incoming call records stored in said memory into voice to output it when said running detecting means detects that the vehicle is not running.

11. The vehicle-installed telephone apparatus according to claim 1, further comprising:
message generating means controlled by said control means,
wherein said control means sends messages stored in said message generating means to a sending-side when said running detecting means detects that the vehicle is running and said incoming call detecting means detects that the incoming call is received at the same time.

12. The vehicle-installed telephone apparatus according to claim 1, further comprising:
a memory for storing the data of incoming call records,
wherein said control means converts messages according to the data of incoming call records stored in said memory into voice to output it when said running detecting means detects that the vehicle is not running.

13. The vehicle-installed telephone apparatus according to claim 1, further comprising:
a memory for storing the incoming call when said running detecting means detects that the vehicle is running and said incoming call detecting means detects that the incoming call is received at the same time.

14. The vehicle-installed telephone apparatus according to claim 13, wherein the memory stores a calling number.

15. The vehicle-installed telephone apparatus according to claim 1,
wherein said announcing means does not ring ringing sounds when said running detecting means detects that the vehicle is running and said incoming call detecting means detects that the incoming call is received at the same time.

16. A vehicle-installed telephone apparatus comprising:
a running detector for detecting that a vehicle is running;
an incoming call detector for detecting an incoming call;
an announcer for announcing to a driver that the incoming call has been received; and
a controller for controlling said announcer,
wherein said controller invalidates said announcer from announcing to a driver that the incoming call has been received when said running detector detects that the vehicle is running and said incoming call detector detects that the incoming call is received at the same time.

17. The vehicle-installed telephone apparatus according to claim 16, wherein said running detector is connected to a parking brake detecting switch.

18. The vehicle-installed telephone apparatus according to claim 17, further comprising:
a message generator controlled by said controller,
wherein said controller sends messages stored in said message generator to a sending-side when said running detector detects that the vehicle is running and said incoming call detector detects that the incoming call is received at the same time.

19. The vehicle-installed telephone apparatus according to claim 17 further comprising:
a voice synthesizer controlled by said controller, and
a memory for storing the data of incoming call records,
wherein said controller converts messages according to the data of incoming call records stored in said memory into voice to output it when said running detector detects that the vehicle is not running.

20. The vehicle-installed telephone apparatus according to claim 16, wherein said running detector is connected to a vehicle speed sensor.

21. The vehicle-installed telephone apparatus according to claim 20, further comprising:
a message generator controlled by said controller,
wherein said controller sends messages stored in said message generator to a sending-side when said running detector detects that the vehicle is running and said incoming call detector detects that the incoming call is received at the same time.

22. The vehicle-installed telephone apparatus according to claim 20 further comprising:
a voice synthesizer controlled by said controller, and
a memory for storing the data of incoming call records,
wherein said controller converts messages according to the data of incoming call records stored in said memory into voice to output it when said running detector detects that the vehicle is not running.

23. The vehicle-installed telephone apparatus according to claim 16, wherein said announcer is included in a portable phone or a car telephone.

24. The vehicle-installed telephone apparatus according to claim 23, further comprising:
a message generator controlled by said controller,
wherein said controller sends messages stored in said message generator to a sending-side when said running detector detects that the vehicle is running and said incoming call detector detects that the incoming call is received at the same time.

25. The vehicle-installed telephone apparatus according to claim 23 further comprising:
a voice synthesizer controlled by said controller, and
a memory for storing the data of incoming call records,
wherein said controller converts messages according to the data of incoming call records stored in said memory into voice to output it when said running detector detects that the vehicle is not running.

26. The vehicle-installed telephone apparatus according to claim 16, further comprising:
a message generator controlled by said controller,
wherein said controller sends messages stored in said message generator to a sending-side when said running detector detects that the vehicle is running and said incoming call detector detects that the incoming call is received at the same time.

27. The vehicle-installed telephone apparatus according to claim 16 further comprising:
a voice synthesizer controlled by said controller, and
a memory for storing the data of incoming call records, wherein said controller converts messages according to the data of incoming call records stored in said memory into voice to output it when said running detector detects that the vehicle is not running.

28. The vehicle-installed telephone apparatus according to claim 16, further comprising:
a memory for storing the incoming call when said running detector detects that the vehicle is running and said incoming call detector detects that the incoming call is received at the same time.

29. The vehicle-installed telephone apparatus according to claim 28, wherein the memory stores a calling number.

30. The vehicle-installed telephone apparatus according to claim 16,
wherein said announcer does not ring ringing sounds when said running detector detects that the vehicle is running and said incoming call detector detects that the incoming call is received at the same time.

* * * * *